United States Patent
Jansson

(10) Patent No.: US 7,895,353 B2
(45) Date of Patent: Feb. 22, 2011

(54) SYSTEM AND METHOD FOR PROVIDING THROTTLING, PRIORITIZATION AND TRAFFIC SHAPING DURING REQUEST PROCESSING VIA A BUDGET SERVICE

(75) Inventor: Andreas E. Jansson, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 299 days.

(21) Appl. No.: 12/188,397

(22) Filed: Aug. 8, 2008

(65) Prior Publication Data

US 2009/0219940 A1 Sep. 3, 2009

Related U.S. Application Data

(60) Provisional application No. 61/032,710, filed on Feb. 29, 2008.

(51) Int. Cl.
  *G06F 15/16* (2006.01)
  *G06F 3/00* (2006.01)
(52) U.S. Cl. .......................... 709/233; 710/29; 710/60; 709/232
(58) Field of Classification Search ................. 709/232, 709/233; 710/29, 60
  See application file for complete search history.

(56) References Cited

U.S. PATENT DOCUMENTS

| | | | |
|---|---|---|---|
| 6,067,301 A | 5/2000 | Aatresh | |
| 6,182,120 B1 * | 1/2001 | Beaulieu et al. | 709/207 |
| 6,611,867 B1 | 8/2003 | Bowman-Amuah | |
| 6,704,933 B1 | 3/2004 | Tanaka et al. | |
| 6,747,970 B1 | 6/2004 | Lamb et al. | |
| 7,032,048 B2 | 4/2006 | Appleby et al. | |
| 7,050,424 B2 | 5/2006 | Cheng et al. | |
| 7,246,376 B2 | 7/2007 | Moharram | |
| 7,301,905 B1 | 11/2007 | Tontiruttananon et al. | |
| 7,328,274 B2 | 2/2008 | Zhang et al. | |
| 7,417,992 B2 | 8/2008 | Krishnan | |
| 7,436,769 B2 | 10/2008 | Loader et al. | |
| 2002/0039352 A1 | 4/2002 | El-Fekih et al. | |
| 2002/0075844 A1 | 6/2002 | Hagen | |
| 2002/0159387 A1 | 10/2002 | Allison et al. | |

(Continued)

OTHER PUBLICATIONS

Foley, Chris, "Dynamic Bandwidth Throttling—A Technical White Paper," XcelleNet, Inc., downloaded from http://www.mobileinfo.com/WhitePapers/XcelleNet_Dynamic%20Bandwidth%20Throttling%20White%20Paper_Final.pdf, 11 pages.

(Continued)

*Primary Examiner*—Philip J Chea
(74) *Attorney, Agent, or Firm*—Fliesler Meyer LLP

(57) ABSTRACT

A network gateway application is described that provides throttling, prioritization and traffic shaping for incoming requests from client applications. A request is received by a plug-in manager component of the gateway application. The plug-in manager can then invoke the budget service in order to determine a current available budget for the request. The budget can be computed according to a service level agreement for the service provider, application or network node. The requests can be of high or low priority. If the budget is greater than a specified priority threshold value, the low priority requests can be denied, while the high priority requests can be processed as long as there is some available budget left. If the budget for the request has reached the restricted level, the request can be denied and optionally enqueued to a traffic shaping queue to be processed at a later time.

19 Claims, 6 Drawing Sheets

U.S. PATENT DOCUMENTS

| | | | |
|---|---|---|---|
| 2003/0095540 | A1 | 5/2003 | Mulligan et al. |
| 2003/0120593 | A1 | 6/2003 | Bansal et al. |
| 2003/0227926 | A1 | 12/2003 | Ramamurthy et al. |
| 2004/0117794 | A1 | 6/2004 | Kundu |
| 2004/0213156 | A1 | 10/2004 | Smallwood et al. |
| 2004/0267882 | A1 | 12/2004 | Whynot et al. |
| 2005/0025050 | A1 | 2/2005 | Roeder |
| 2005/0108422 | A1* | 5/2005 | Krishnan ............. 709/233 |
| 2005/0207432 | A1 | 9/2005 | Velez-Rivera et al. |
| 2005/0259806 | A1 | 11/2005 | Chang |
| 2007/0118653 | A1 | 5/2007 | Bindal |

OTHER PUBLICATIONS

Throttle, downloaded from http://www.1060research-server-1.co.uk/docs/3.0.0/book/developerreference/doc_ura_throttle.html on Nov. 6, 2008, 2 pages.

WinGate, Extended Networking Services—Bandwidth Throttling, downloaded from http://www.redline-software.com/eng/support/docs/wingate/BandwidthThrottling.php on Nov. 7, 2008, 2 pages.

Yau, David K. Y., et al., "Defending Against Distributed Denial-of-Service Attacks with Max-Min Fair Server-Centric Router Throttles," IEEE, ACM Transactions on Networking, vol. 13, No. 1, pp. 29-42 (Feb. 2005).

International Search Report and Written Opinion for PCT/US07/69021 dated Jul. 25, 2008, 10 pages.

International Search Report and Written Opinion for PCT/US06/11165 dated Oct. 22, 2007, 7 pages.

International Search Report and Written Opinion for PCT/US06/11429 dated Aug. 7, 2007, 6 pages.

Zhuang, W. et al., Siemens Private Limited, "Policy-Based QoS Architecture in the IP Multimedia Subsystem of UMTS," IEEE Network, May-Jun. 2003, pp. 51-52.

* cited by examiner

SYSTEM AND METHOD FOR PROVIDING THROTTLING, PRIORITIZATION AND TRAFFIC SHAPING DURING REQUEST PROCESSING VIA A BUDGET SERVICE

CLAIM OF PRIORITY

The present application claims the benefit of U.S. Provisional Patent Application No. 61/032,710 entitled SYSTEM AND METHOD FOR PROVIDING THROTTLING, PRIORITIZATION AND TRAFFIC SHAPING DURING REQUEST PROCESSING VIA A BUDGET SERVICE, by Andreas E. Jansson, filed on Feb. 29, 2008, which is incorporated herein by reference in its entirety.

CROSS REFERENCE TO RELATED APPLICATIONS

The following commonly owned, co-pending United States Patent Application is related to this application and is incorporated by reference herein in its entirety:

U.S. patent application Ser. No. 11/432,934, entitled SYSTEM AND METHOD FOR SHAPING TRAFFIC, by Jan Thomas Svensson, filed on May 12, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to managing telecommunications and more particularly to a method for throttling telecommunication application traffic during the processing of requests via use of budgets and a budget service.

BACKGROUND

With the ever-increasing popularity of the World Wide Web, more and more previously unrelated technologies are becoming integrated with the enormous network of information and functionality that the internet provides. Everything from television and radio to books and encyclopedias are becoming available online, amongst a wide variety of other technologies. One such area of technology is telephony and the related telecommunications services.

Conventionally, telecommunications and network infrastructure providers have relied on often decades-old switching technology to providing routing for network traffic. Businesses and consumers, however, are driving industry transformation by demanding new converged voice, data and video services. The ability to meet these demands can often be limited by existing IT and network infrastructures that are closed, proprietary and too rigid to support these next generation services. As a result, telecommunications companies have been transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

Delivering these more sophisticated data services has proved to be more difficult than first imagined. Existing IT and network infrastructures, closed proprietary network-based switching fabrics and the like have proved to be too complex and too rigid to allow the creation and deployment of new service offerings.

While the worlds of TCP/IP applications and of telephony networks continue to converge, the relationship between them has often been overly complex and difficult to manage for various organizations, as well as for consumers. In recent times, specialized telecommunication servers and various gateway applications have emerged to enable simpler ways for developers to include telephony-based functionality in their software applications, as well as provide increased security and stability. Nevertheless, these specialized solutions continue to need improvements in performance generally required by network operators and demanded by their subscribers. One such area for improvement is the management of dense request traffic typically handled by such applications.

DETAILED DESCRIPTION

Figure 1:
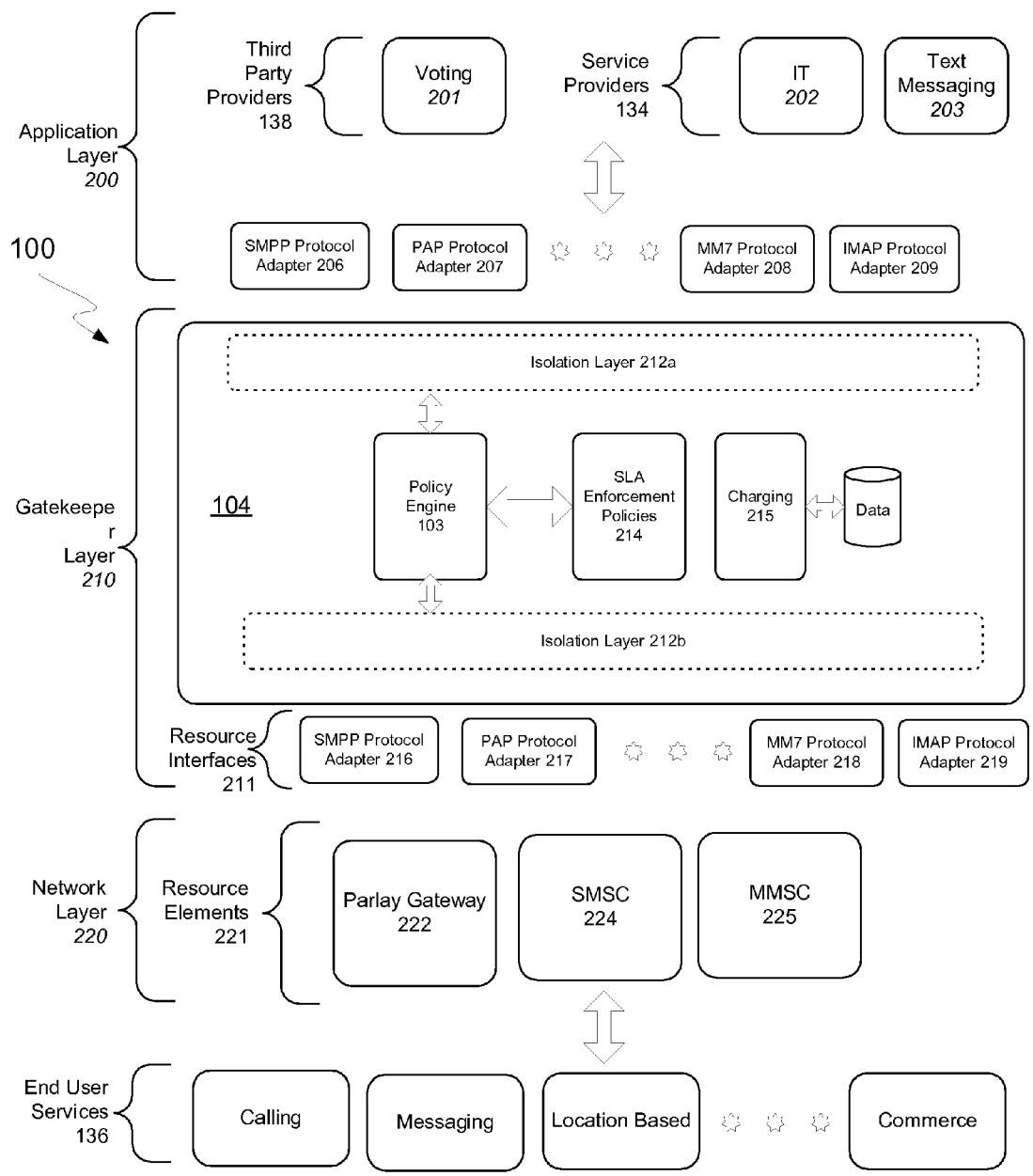
FIG. 1 is an illustration of a network gatekeeper application that can be used in conjunction with the traffic throttling in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a server or a router. Furthermore, it can also be apparent to those skilled in the art that such components, regardless of how they are combined or divided, can execute on the same computing device or can be distributed among different computing devices connected by one or more networks or other suitable communication means.

In accordance with the embodiments of the invention, there are provided mechanisms and methods for providing throttling and traffic shaping during request processing in the context of an IP multimedia system (IMS) Service Delivery Platform (SDP) via use of a budget service. In this context, throttling limits the rate at which requests will be processed by a network gateway server that manages access to various IMS services. Traffic shaping, on the other hand, is intended to delay requests when the throttle limit is reached and process those requests at a later time. This can allow the server to handle spikes of requests without having to reject them. A budget service can rely on traffic history and can simplify the enforcement of service level agreements (SLAs) in the network cluster. It should be noted that the throttling and traffic shaping features can be implemented along with other forms of traffic control, such as additional traffic shaping that is implemented in the traffic path itself.

In various embodiments, the traffic shaping and throttling features are implemented in a network gatekeeper application built on top of a JAVA 2 Enterprise Edition (J2EE) compliant application server. The network gatekeeper can provide a policy driven telecommunications web services gateway that allows granular control over access to network resources from un-trusted domains. In one embodiment, the network gatekeeper can be an application deployed by a telecom provider in order to manage access to its network by the third party services that are offered to the various subscribers of the telecom provider.

As an illustration, most operators and telecommunication providers expect to drastically increase the portfolio of services offered to their customers to hundreds and even thousands of content and application offerings. While some of these services may be developed in-house (and thus be deployed on an internal network), the vast majority of such services will likely come from third party service providers and partners. This creates a need to handle the network and application integration with such third party services, as well as manage the entire ecosystem to the satisfaction of the consumers. The network gatekeeper application can provide a secure common entry point for third party applications accessing network resources both through telecom web services interfaces and through policy-based, secure and extensible network interfaces. In one embodiment, the network gatekeeper can include a service level agreement (SLA) based policy enforcement engine, which can enforce third-party partner SLA policies at runtime. It can also enable network operators to dynamically customize partner SLA data and access rules to fit traffic prioritization models and the capacity of each individual network node.

Additionally, the network gatekeeper can provide rich traffic management and shaping features, as described throughout the present disclosure. This can allow operators to create deterministic traffic management solutions, distribute traffic internally throughout the network and increase the availability and reliability of services.

The network gatekeeper can be deployed on the telecom operator network in multiple tiers of deployment—a stateless access tier and a stateful network tier. In one embodiment, the two tiers implement a firewall in between them for greater security. The stateless access tier can serve as an entry point for (possibly un-trusted) third party applications into the network. The network tier which integrates with the internal network can be shielded from the applications by the access tier.

In various embodiments, the throttling of traffic can be implemented within the network tier of deployment. Throttling can begin by receiving a number of incoming requests from third party applications. The purpose of throttling traffic is generally to limit the rate at which these requests will be processed. In order to achieve this, a budget service is first invoked by an entity such as a plug-in manager, in order to determine the budget for each incoming request. The budget service is a service designed to simplify the enforcement of service level agreements (SLAs) in the network cluster. In one embodiment, the SLA enforcement is based on a budget. The budget reflects the current request rate based on traffic history. In one embodiment, the budget is created based on the parameters configured in the SLAs when these are provisioned. Each instance of the network tier updates the local traffic count and updates the cluster wide count maintained by one selected instance (cluster master or hub) based on load and/or regular intervals. The cluster master is a singleton service that is highly available and can be guaranteed to be available by the application server infrastructure. This can be implemented by having only one running instance of the budget service on the network at any given time. This singleton service is also guaranteed to be active on only one application server in the cluster, which makes it possible to implement a solution that enforces SLA accurately. Budget values which span longer periods of times can be persisted in the persistent store to minimize the state loss in the event of failure of the cluster master.

Once the plugin manager receives the current budget for the incoming request from the budget service, traffic can be throttled based on that budget. In one embodiment, priority is determined for the request. The priority of the request can be determined by the SLA and can generally serve to distinguish requests coming from more important applications from those of less important applications. As an illustration, a mapping or global positioning application (GPS) application may have higher priority then a television show voting application.

If there is enough budget available, the request is allowed and the budget is decreased accordingly. In various embodiments, this evaluation of the budget is performed for each service provider, each application and each node. For example, a service provider may have a plurality of different applications and one budget can be enforced across all of them for the service provider. In this manner, the total traffic is throttled for each provider. Similarly, the traffic for each application can have a separate budget, as well as each network node. If the request is not executed for some reason, any reserved budget can be returned.

For network node SLAs, request priority can also be taken into account, i.e. if the request is below the method guarantee or not as defined in the service provider and application SLA. In one embodiment, all requests are allowed as long as the budget is greater than a specified configurable value (guarantee threshold). This value can be specified as a particular percentage of the budget maximum. In various embodiments, the budget can be typically close to the budget maximum as long as traffic rate is less than the allowed rate. When the budget gets below the configurable guaranteed threshold, the logic to process the request can be as follows:

a. If requests are of low priority, block the requests. In this case, the request rate has gone above the guaranteed limits.

b. If requests are of high priority, allow processing the requests so long as there is some available budget left.

c. If no budget is left available, block the requests.

In accordance with embodiments, there are also provided mechanisms and methods for shaping the request traffic. Shaping traffic can delay the processing of the requests until a later time. Thus, once the throttling has reached the traffic restriction level and the requests are blocked, traffic shaping can begin to schedule the requests to a queue to be processed later. The mechanisms and methods for shaping traffic can enable embodiments to control traffic flow at a network gatekeeper based upon policies implementing service level agreements dictating traffic characteristics permitted to applications and/or by network node.

In various embodiments, the throttling and traffic shaping takes place at the entry points into the network tier of the gatekeeper deployment. It is preferable that, before any scheduling is executed to fulfill a given request, the throttling and scheduling decisions are complete. In one embodiment, all budget related decisions are evaluated on the same threads reading the sockets, separate from the threads that are executing the actual requests. Throttling decisions that result in denial will cause work associated with the current request to not be scheduled. Because of this, an appropriate exception can be returned to the client to indicate the reason(s) for dropping the given request.

In one embodiment, the traffic shaping decisions based on current traffic volume and provisioned SLAs are also made on the threads responsible for reading RMI sockets. In this case, there is no additional scheduling that needs to happen for traffic being shaped. The appropriate delay for shaped traffic can be determined at the entry point into the network tier and the work corresponding to the shaped request is enqueued for later execution. In one embodiment, the work scheduled in the network tier will execute asynchronously with respect to the requests generated in the access tier. In order to re-use the socket reader threads, the throttling and traffic shaping decisions should evaluate very quickly in order to not impact the overall throughput.

The various embodiments are illustrated in conjunction with the figures described below. It should be noted, however, that the components illustrated in the figures are not intended to limit the scope these embodiments and are provided purely for purposes of illustration and explanation.

FIG. 1 is an illustration of a network gatekeeper application that can be used in conjunction with the traffic throttling in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

The network gatekeeper 104 provides a policy-driven telecommunications Web services gateway that allows granular control over access to network resources from un-trusted domains. This gateway application can be deployed by a telecom provider in order to manage access to its internal network and its subscribers by external third party service provider applications.

As illustrated by way of example, an embodiment of a network gatekeeper layer 210 provides an easy to use, integrated, configuration-driven intermediary between service providers 134, third party service providers 138 and end users 136. The communications platform of a typical telecom organization can comprise an application layer 200 with interfaces to applications of the service providers 134 and third party service providers 138 and a network layer 220 to interface with the end users 136 via one or more network resource elements 221. The communications platform can further comprise a gatekeeper layer 210 interposed between the application layer 200 and the network layer 220 for managing and controlling information flowing between layers 200 and 220.

At the application layer 200, third party service providers 138 and service providers 134 are provided protocol adapters 206-209 to make services 201-203 available to callers over a network via the gatekeeper layer 210 provided by the communications platform 100. Access to network resource elements 221 by services 201, 202, 203 may be achieved using one or more web services protocol adapters 206-209. The protocol adapters 206-209 provide an interface mechanism, enabling the network gatekeeper 104 to intercept protocol communications from services 201-203 and control access to network resource elements by the services 201-203 in accordance with one or more policies. While illustrated here with reference to an embodiment having adapters to specific protocols, including without limitation, a Short Message Peer-to-Peer protocol (SMPP) protocol adapter 206, a Push Application Protocol (PAP) protocol adapter 207, a Multimedia Messaging Services (MM7) protocol adapter 208 and an Internet Message Access Protocol (IMAP) protocol adapter 209, embodiments may include any number or kind of protocols and are neither limited to, nor required to possess, these illustrated protocol adapters.

The gatekeeper layer 210 includes a gatekeeper 104 that comprises a plurality of functional elements working in concert to control access to network resource elements 221 at the network layer 220 by services 201-203 according to one or more policies. In an embodiment, a service level agreement (SLA) 214 comprises one or more policies governing access to the network layer 220. A policy engine 103 provides enforcement of the service level agreements. Service level agreements specify, e.g., how many messages a service provider sends per hour, and if over a contract limit, the service provider may start paying additional licensing to the telecom provider. In one embodiment, capabilities to create, customize, and execute service level agreement provisions as policies are provided. A charging mechanism 215 determines charges to callers for making a call using network resource elements 221, e.g., determine charges for network traffic (i.e., calls) according to charging information payment amount/schedule, priorities, and the like. Charging mechanism 215 may access data including Call Data Records (CDR) and/or Event Data Records (EDR) in order to determine charges. In one embodiment, the charging mechanism 215 determines an allocation of charges to be apportioned to the third party providing the service. As shown by the dotted lines in FIG. 1, the actions of the policy engine 103 and other functional elements of the gatekeeper 104 provide virtual isolation layers 212a, 212b between services 201-203 at the application layer 200 and network resource elements 221 at the network layer 220. The isolation layers 212a, 212b indicate that the gatekeeper layer 210 functional elements can be isolated from, and unaffected by, the particulars of protocols, interfaces and the like used by applications, services and callers communicating using the network via the gatekeeper 104.

The gatekeeper layer 210 may include one or more resource interfaces 211 to interface with legacy protocols 216-218 or other web services protocols 219 as a mechanism to reach callers and end user applications (clients) via the network layer 220. While illustrated here with reference having resource interfaces to specific protocols, including without limitation, an SMPP protocol adapter 216, a PAP protocol adapter 217, an MM7 protocol adapter 218 and an IMAP protocol adapter 219, embodiments may include any number or kind of protocols and are neither limited to, nor required to possess, these illustrated resource interfaces. An extension toolkit (not shown) enables partners to develop resource interfaces for other protocols to include into the gatekeeper layer 210.

Network layer 220 includes one or more resource elements 221 such as without limitation a Parlay (protocol) gateway 222, an IMS (IP multi-media subsystem) 223, an SMSCs (short-message-service-center) 224 and MMSCs (multi-media messaging service center) 225, each of which provides a mechanism for moving information through the network to one or more end user services 136.

Tools for interacting with Web Services, such as a Web Service—Universal Description Discovery Interface (WS/UDDI), a Web Service—Business Process Execution Language (WS/BPEL) may also be coupled to the network gatekeeper 104 in various embodiments. A log/trace and database can assist with troubleshooting. In some deployments, the network gatekeeper can interface with processes that monitor underlying network function, such as Operations Support Systems/Business Support Systems (OSS/BSS) system via RA protocol adapters. (RA protocol is a protocol for submission of billing information that are maintained in the network gatekeeper 104 and sent to a carrier's existing billing infrastructure.) Embodiments can include one or more of the following services OSS/BSS services. For example and without limitation, Operations Support Systems services can include activation, service assurance, usage/metering and provisioning, including designing, assigning and inventory. Business Support Systems can include billing, including invoicing, rating, taxation, and collections, customer management, including order entry, customer self services, customer care, trouble ticketing, and customer relationship management. Such interfaces can provide access to Operation, Administration, and Maintenance (OAM) applications and others. A policy engine can control access by one or more third party services and services to resource elements in a network layer.

Figure 2:
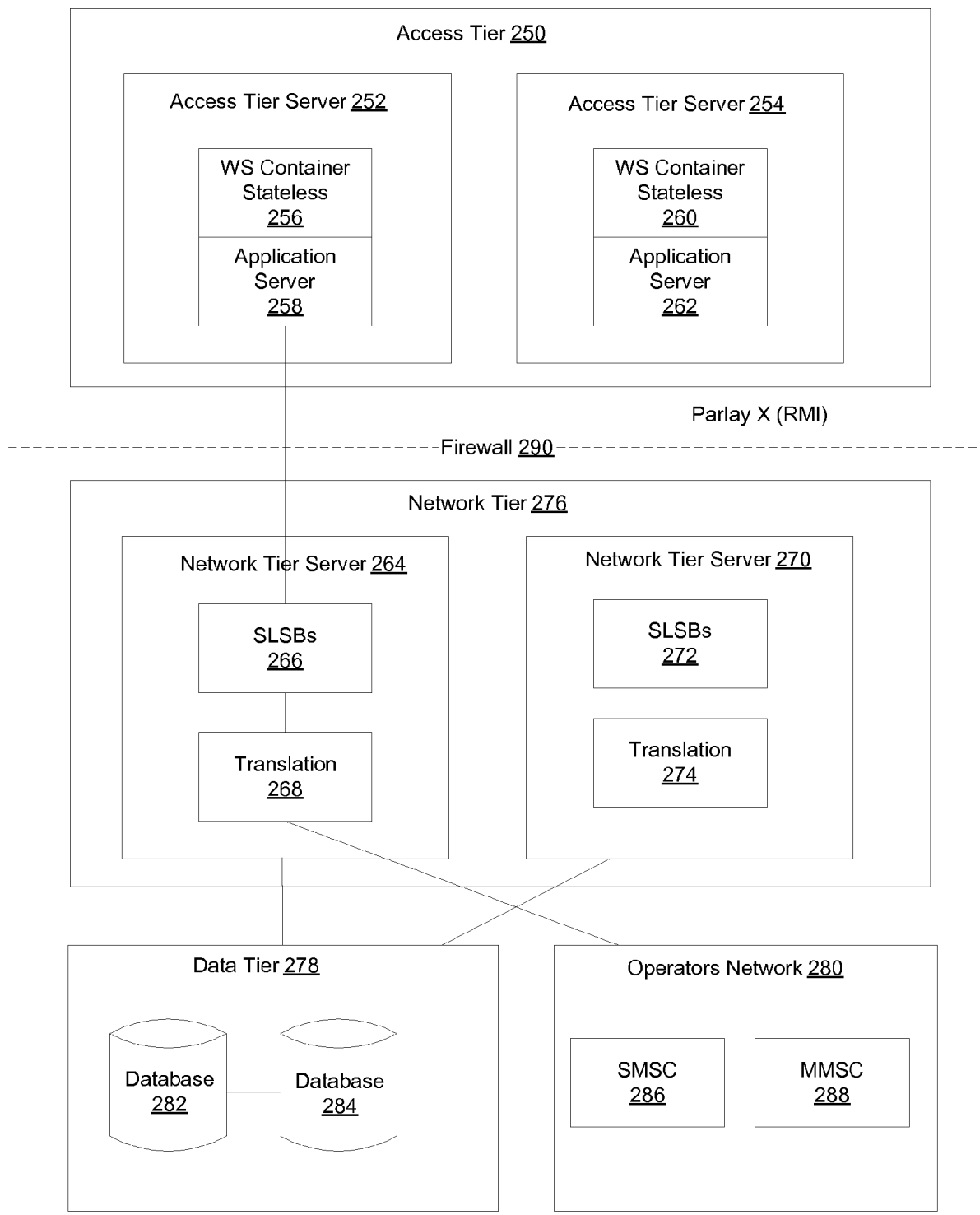
FIG. 2 is an illustration of the network gatekeeper deployment within a telecommunications network, in accordance with various embodiments.

FIG. 2 is an illustration of the network gatekeeper deployment within a telecommunications network, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the network gatekeeper can be deployed in two tiers—an access layer cluster and a network layer cluster having a firewall 290 in between. The access tier 250 is the entry point for third party applications into the operator's network. The purpose of the access tier is to provide a first level of protection from malicious applications and other potential threats against the integrity of the operator's network. In one embodiment, the access tier can be distributed across multiple access tier servers 252, 254 having an application server software 258, 262 deployed thereon. The web services stateless container 256, 260 can be implemented on top of the application server, allowing the access tier to receive requests into the access tier.

The network tier 276, which integrates with the operator's network, is shielded from applications by the access tier 250. The communications between the access tier and the network tier can be over the Parlay X Web Services as remote method invocations (RMI). The network tier can be comprised of multiple network tier servers 264, 270. In one embodiment, stateless session beans (SLSBs) 266, 272 can be deployed on the network tier servers. In addition, the network tier can include the translation logic components 268, 274, for translating the communications into specific network protocols, as previously described.

Each tier can be scaled individually by adding new servers. In one embodiment, each server in each tier is running in an active mode.

The deployment can additionally include a data tier 278 with databases 282, 284 or some other forms of persistent storage. Furthermore, the operator's network 280 typically provides a short messaging service center (SMSC) 286 and a multimedia messaging service center (MMSC) 288 to the various subscribers. The SMS center 286 and the MMS center 288 are responsible for handling the SMS operations and the MMS operations (respectively) of a wireless network. For example, when an SMS message is transmitted by a mobile phone, it reaches the SMS center 288, which can then forward the message to the recipient. In various embodiments, the main duties of the SMSC and the MMSC are to route various messages and to regulate the process.

Figure 3:
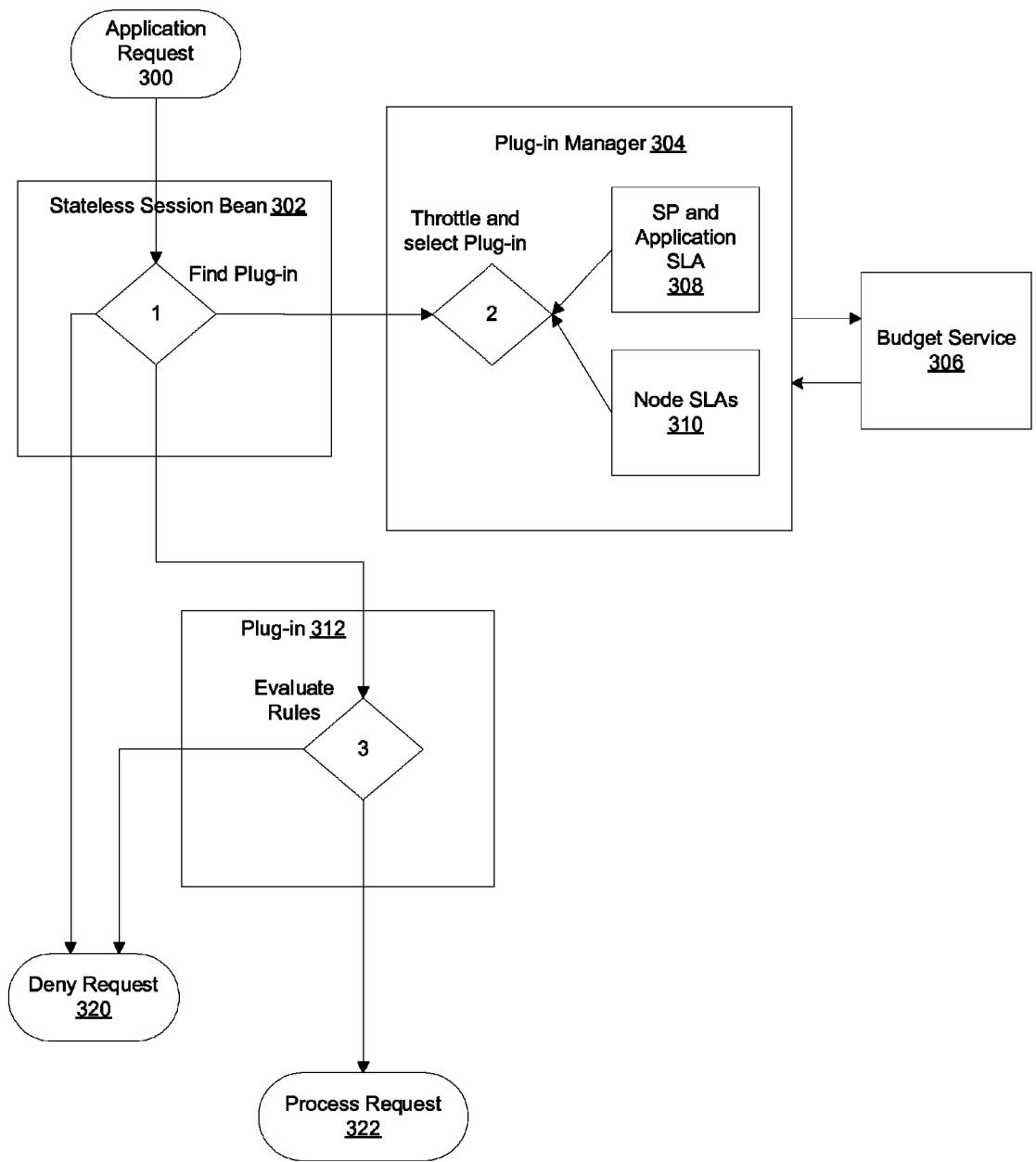
FIG. 3 is an illustration of the traffic throttling during application request flow within the network gatekeeper, in accordance with various embodiments.

FIG. 3 is an illustration of the traffic throttling during application request flow within the network gatekeeper, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, an application request 300 can come into the access tier and then be transmitted to a stateless session bean (SLSB) 302 in the network tier. In one embodiment, all scheduling and throttling decisions are made at this entry point into the network tier. Once the request hits the SLSB, it is forwarded to the plug-in manager which will decide on the plug-in to use for the request. Thus, in one embodiment, the first step (1) is to find the right plug-in for the request by invoking the plug-in manager 304. The plug-in manager will, based on the available plug-ins, configured routes and SLAs, find a suitable plug-in (2). If no plug-in is available or the throttle limits in the SLA are violated, the request is rejected. In one embodiment, this decision can be based on the following parameters:

a. Service provider and Application SLAs (methodGuarantee, methodRestriction and quota parameters).

b. Service provider Node SLA (the request limit parameters).

c. Network node SLA (the request limit parameters).

d. The called interface and method name.
e. The current request rates retrieved from the budget service.

In the plug-in, the first policy enforcement points can be implemented. In one embodiment, these policy enforcement points are separate from any throttling or traffic shaping. In the case of a retained plug-in, there may be no policy enforcement in the plug-in.

In one embodiment, the plug-in manager 304 invokes the budget service 306 in order to obtain the available budget for the service provider, application or network node. The plug-in manager has access to the service provider and application SLA 308, as well as the individual node SLA 310.

Once the plug-in manager 304 obtains the appropriate budget for the request, it can throttle the traffic according to that budget. The request can then be forwarded to the appropriate plugin 312 where the rules can be evaluated (3).

In various embodiments, the request is either denied 320 or processed 322. If the request is processed, it will access the operators network and perform the intended functionality of the application. If it is denied, it can be either dropped or alternatively, traffic shaping can re-schedule the request to be processed at a later time. This can allow the system to handle large spikes of traffic without having to reject the requests.

In various embodiments, to support all the various throttling and traffic shaping limits, the budget service is implemented, which tracks historical traffic data. Thus, rather than resetting the budget each specified time period, the budget service can track the average usage (i.e. requests processed) in order to provider a better accounting and traffic control. In various embodiments, the budget service keeps track of the following budgets:

For service provider (SP) SLA:
1 budget for each methodRestriction. Identified by the combination of "plug-in type+methodname+SP"
1 budget for each methodGuarantee. Identified by the combination of "plug-in type+methodname+SP"

For Application SLA:
1 budget for each methodRestriction. Identified by the combination of "plug-in type+methodname+SP+APP"
1 budget for each methodGuarantee. Identified by the combination of "plug-in type+methodname+SP+APP"

For SP node SLA:
1 budget for each nodeRestriction. Identified by the combination "nodeId+SP"

For network node SLA:
1 budget for each globalRestriction. Identified by the nodeId.

Additionally, the request limits and guarantees are defined in the service level agreement (SLA) which can be used to compute the budget at any given time. To illustrate, the following are some possible SLA definitions:

Service Provider (SP) and Application SLAs:
Request limit is defined as requests per time period for each method. For example, 10 req/2000 milliseconds (ms) using a "sendSms" method.
Method guarantee is defined as requests per time period for each method. If request rate is below this limit, the priority of the request will be high.
SP node SLA:
Request limit is defined as requests per time period (no separation for different methods). For example, 20 req/1000 ms.
Network node SLA:
Request limit is defined as for SP node SLA. Throttling and traffic shaping for this limit should take request priority into account.

It should be noted that the budgets and SLAs illustrated above are provided as examples only and that these components can be implemented in various other forms within the scope of the present embodiments.

Figure 4:
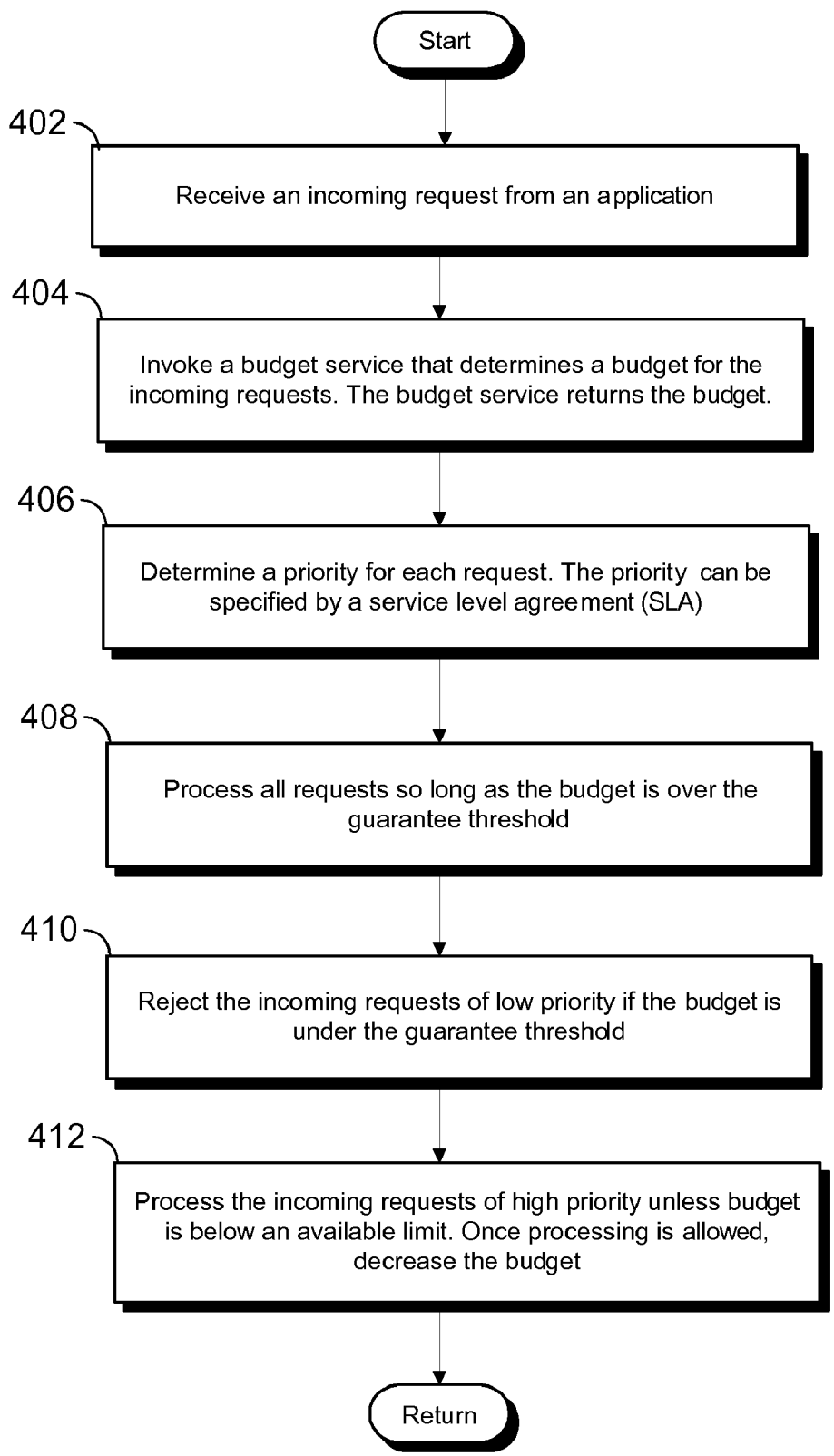
FIG. 4 is an exemplary flow chart diagram of an overall process of the throttling functionality in accordance with various embodiments.

FIG. 4 is an exemplary flow chart diagram of an overall process of the throttling functionality in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 402, an incoming request can be received from a third party application. In step 404, the budget service is invoked by an entity handling the request, such as the plug-in manager. The budget is created based on the parameters configured in the SLAs when they are provisioned. The budget service is an entity that returns the available budget associated with the request for each service provider (SP), application and network node. In step 406, the priority is additionally determined for the request. The priority of the request can be specified in an SLA.

In step 408, all requests can be processed as long as the budget is over a specified guaranteed threshold value. This value can be specified as a percentage of the maximum budget before it hits a restriction value. As long as the budget is greater than the guaranteed threshold, all requests can be allowed by the throttling feature and will be processed assuming they fulfill their security and various other requirements.

If the budget is under the guaranteed priority limit threshold, the low priority requests will be rejected, as shown in step 410. The high priority requests, on the other hand, can still be processed until the budget hits the restriction level (runs out), as shown in step 412. Upon processing the request, the budget is decreased accordingly. If the request processing is denied, it can be traffic shaped by rescheduling the request for processing at a later time.

As an illustration of the functionality described above, an SLA can specify that the request limit is 2 requests per every time period of 1000 milliseconds (2/1000 ms) and the priority limit is 50%. This means that the budget in this case would be between 0 and 2. If four requests are transmitted within 0 millisecond interval between each other with the priorities L, L, H, H, the following would take place:
a. Start: Budget is 2 and no requests are waiting.
b. Request 1 (low priority L): Budget is decreased to 1, still above the priority limit, and the request is allowed.
c. Request 2 (low priority L): Since the request is low priority and budget would go below the priority limit, the request is denied.
d. Request 3 (high priority H): Budget is decreased to 0 and the request is allowed for processing.
e. Request 4 (high priority H): Budget is now exhausted and the request is not allowed.

Figure 5:
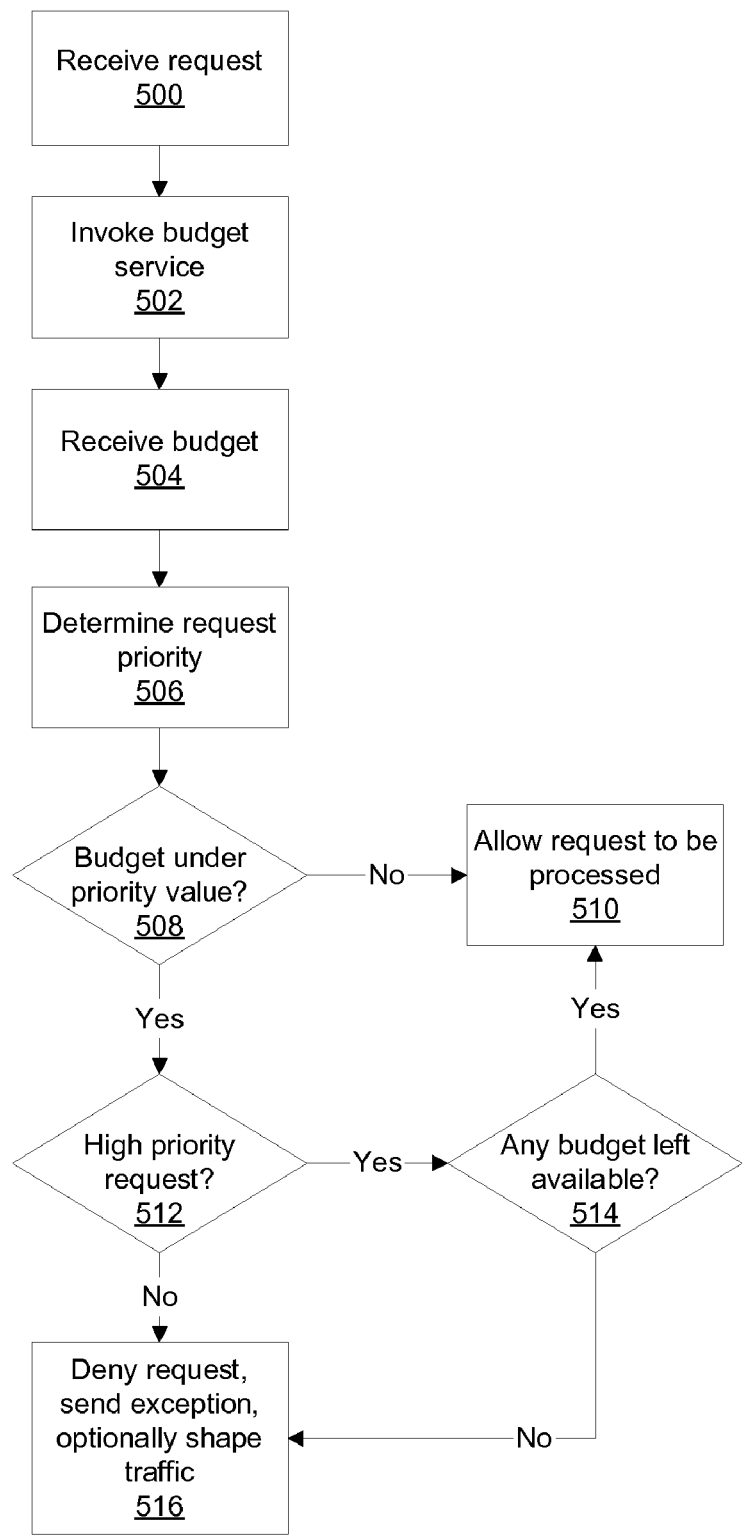
FIG. 5 is an exemplary logical flow chart diagram of the throttling functionality in accordance with various embodiments.

FIG. 5 is an exemplary logical flow chart diagram of the throttling functionality in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 500, a request is received from an application to the entry point into the network tier of the gateway application. In step 502, the budget service is invoked to determine the available budget for the request. In step 504, the budget is obtained from the budget service and this budget is used to throttle the request. In step 506, the priority of the request is also determined. If the budget is under the designated priority threshold value (step 508), it is processed in step 510. Stated differently, all requests can be processed without regard to priority if the budget is over a certain specified value.

If the budget is under the priority threshold, it is determined (step 512) whether the request is designated as being high priority (H). If it is, the request should be allowed to be processed, so long as there is any available budget at all (step 514). If, on the other hand, the request is of low priority, or if there is no more budget available, the request is denied in step 516. Upon denying the request, an appropriate exception can be sent to the client and the request. Furthermore, the request can optionally be enqueued for later processing if traffic shaping is implemented within the gatekeeper.

Figure 6:
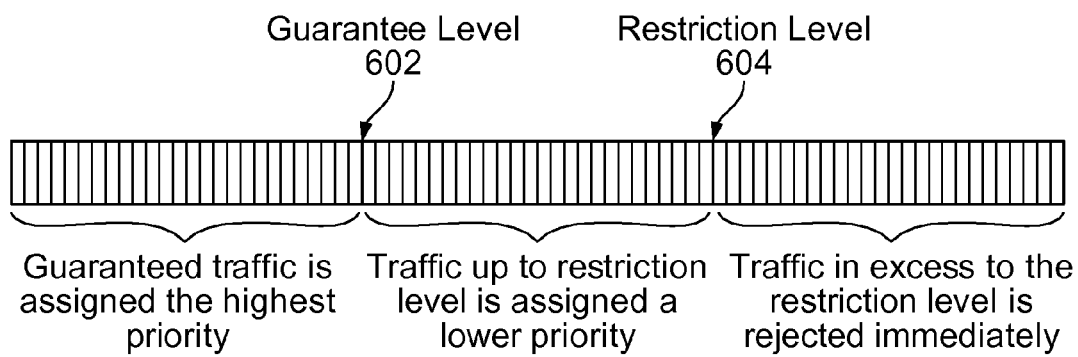
FIG. 6 is an illustration of functional aspects of an example application traffic prioritization technique for a service capability, in accordance with various embodiments.

FIG. 6 is an illustration of functional aspects of an example application traffic prioritization technique for a service capability, in accordance with various embodiments.

In the embodiment illustrated by FIG. 6, each application has a service contract for each service capability type (messaging, location, status etc). Each service contract specifies two traffic levels, a guaranteed traffic level 602 and a restriction traffic level 604. Traffic level priority assignments are configurable in the SLA. Each traffic level is assigned a priority under the Service Level Agreement.

In an embodiment, the guarantee and restriction levels may be assigned with a five-step priority level. This way, different services/service providers can have different priorities for their prioritized and non-prioritized traffic. It is noteworthy that if the guarantee level is really used as a guarantee to an application, the highest possible value should be assigned for all applications. Otherwise, the guaranteed traffic for certain value-added service providers (VASPs) will actually have a lower priority compared to guaranteed traffic for other applications.

In various aspects, the embodiments previously described encompass computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, virtual machines and user applications.

Included in the programming (software) of the general/specialized computer or microprocessor are software modules for implementing the teachings of the present invention, including, but not limited to providing mechanisms and methods for throttling, prioritizing and shaping traffic as discussed herein.

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Embodiments can provide, by way of example and without limitation, services such as:

VoIP services, including, without limitation the following features:

Basic features. These include standards services such as Voice mail, Caller ID, Call waiting, and call forwarding (the ability to forward a call to a different number).

Advanced features. The list of advanced features is operators specific. Following is a brief list of advanced features:

Call logs: The ability to view calls made over a given period of time online, ability to associate names with phone numbers, integrate call log information to other applications such as Do not disturb: The ability to specify policies around receiving calls—for example, all calls during office hours to be automatically forwarded to a mobile terminal, all calls during the night to be directed to voice mail etc.

Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.

Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.

Lifetime number: This is the facility where a single virtual number can travel with a customer wherever they live. Even if they move, the old number continues to work, and reaches them at their new location. This is really the analog of static IP addresses in a phone network.

Speed dial: This is the ability to dramatically expand the list of numbers that can be dialed through short-key and accelerator combinations. This is another example of a converged application, since it's very likely that when a user will set up this information when they work through the call logs on the operator user portal, and the updated information needs to be propagated to the network side in real-time.

Media delivery services, including, without limitation the following features:

Depending on the service level agreement users are willing to sign up to, the quality of media delivered (e.g. # of frames per second) will vary. The policy engine enables segmenting the customer base by revenue potential, and to maximize return on investment made in the network.

Context-sensitive applications including, without limitation the following features:

A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:

This class of applications is one that combines wireline and wireless terminal usage scenarios. An example of an integrated application is the following: a mobile terminal user is on a conference call on their way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

As previously described herein, the term service level agreement (SLA) is an agreement concerning a measurable level of service between a service provider and a service consumer. The SLA can include or define a number of items, including but not limited to bandwidth, request processing, delay and other parameters. In one embodiment, an SLA is implemented as one or more extensible markup language (XML) files. In various embodiments, the terms service and web service are used interchangeably and are intended to be broadly construed to include any application, program or process resident on one or more computing devices capable of providing services to a requester or other recipient, including without limitation, network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services. As used herein, the term application broadly includes any data entry, update, query or program that processes data on behalf of a user. Users may be human or computational entities.

As used herein, the term web services protocol is defined as a communications protocol that can be used for providing services between two or more applications over a network. Typical web services protocols include without limitation Short Message Peer-to-Peer protocol (SMPP) protocol, Push Application Protocol (PAP) protocol, Multimedia Messaging Services (MM7) protocol and Internet Message Access Protocol (IMAP) protocol. As used herein, the term legacy protocol is defined as a communications protocol implemented by existing applications or telecommunications systems. As used herein, the term policy is defined as a computational object including information for enforcing a limitation, a decision or otherwise causing a control point to take some action or refrain from taking some action to shape traffic.

As previously mentioned, the various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

The invention claimed is:

1. A method for providing traffic throttling via a budget service, said method comprising:
   receiving, at a gateway, one or more incoming requests from an application associated with a service provider, the request to be processed by a network node of said gateway;
   determining, by said gateway, a budget for the application, wherein the budget for the application reflects current request rate being sent by the application based on traffic history;
   determining, by said gateway, a budget for the service provider, wherein the budget for the service provider reflects current request rate being sent by the service provider based on traffic history;
   determining a budget for a network node in the gateway, wherein the budget for the network node reflects current request rate being processed by the network node based on traffic history; and
   throttling the incoming requests at the gateway according to each of: the budget for the application, the budget for the service provider and the budget for the network node;
   wherein throttling the incoming requests according to the budget for the application and the budget for the service provider further includes:
     determining whether the budget for the application and the budget for the service provider are available; and
     if available, allowing the request to be processed and decreasing the budget for the application and the budget for the service provider accordingly, otherwise denying the request from being processed;
   wherein throttling the incoming requests according to the budget for the network node further includes:
     determining a priority for each of said incoming requests, the priority being based on a service level agreement;
     processing said incoming requests if the budget for the network node in the gateway is over a guarantee threshold;

rejecting the incoming request of low priority if the budget for the network node in the gateway is under said guarantee threshold; and processing the incoming requests of high priority unless the budget for the network node in the gateway is below an available limit.

2. The method of claim 1, further comprising:

rejecting the incoming requests of high priority if the budget is under the available limit.

3. The method of claim 1 wherein processing each request further includes:

decreasing the budget after allowing the processing of the request.

4. The method of claim 1, further comprising:

maintaining a stateful network tier and a stateless access tier wherein the incoming request is first received at the access tier and wherein the budget service is invoked within the network tier.

5. The method of claim 1 wherein the budget service tracks historical data such that the budget is compensated for lost request traffic that was not processed during a network failure.

6. The method of claim 1 wherein invoking the budget service further includes:

transmitting a service provider identifier, an application identifier and a node identifier to the budget service; and receiving a budget for each of the service provider, the application and the node from the budget service.

7. The method of claim 1 wherein determining a priority of each incoming request further includes:

assigning said incoming requests into a plurality of queues, each queue being of different priority, length and weight; and selecting, by a dispatcher, requests from the plurality of queues in order of priority.

8. The method of claim 1 wherein rejecting the incoming request further includes:

enqueuing the incoming request to a traffic shaping queue in order to be processed at a later time.

9. The method of claim 1 wherein the incoming requests are initiated by a service provider application that provides telecommunication services to clients via a network gateway.

10. A system that provides a network gateway for throttling request traffic, said system comprising:

a client application that initiates a request and transmits the request to the network gateway, said request to be processed by a network node in said gateway, wherein the client application is associated with a service provider;

a plug-in manager executing on a computing device that receives the request and selects an appropriate plug-in for said request; and a budget service executing on said computing device that is invoked by the plug-in manager wherein the budget service returns a budget for the client application, a budget for the service provider, and a budget for the network node to the plug-in manager in response to the invocation, wherein the plug-in manager throttles the request based on each of: the budget for the client application, the budget for the service provider and the budget for the network node returned by the budget service;

wherein throttling the incoming requests according to the budget for the client application and the budget for the service provider further includes:

determining whether the budget for the application and the budget for the service provider are available; and if available, allowing the request to be processed and decreasing the budget for the application and the budget for the service provider accordingly, otherwise denying the request from being processed; and wherein throttling the incoming requests according to the budget for the network node further includes:

determining a priority for each of said incoming requests, the priority being based on a service level agreement;

processing said incoming requests if the budget for the network node in the gateway is over a guarantee threshold;

rejecting the incoming request of low priority if the budget for the network node in the gateway is under said guarantee threshold; and processing the incoming requests of high priority unless the budget for the network node in the gateway is below an available limit.

11. The system of claim 10 wherein the request is designated as being either a high priority or low priority request.

12. The system of claim 10 wherein the budget further includes a specified priority value such that only requests that have been designated as being high priority are allowed to be processed once the budget reaches said priority value.

13. The system of claim 10 wherein once the request is processed, the current available budget is decreased.

14. The system of claim 10, further comprising:

a stateless access tier that receives and forwards the request; and a stateful network tier that receives the request from the access tier and performs the throttling of the request, said network tier having the plug-in manager deployed thereon.

15. The system of claim 10, further comprising:

a service level agreement associated with the request, said service level agreement specifying a request limit that is used to compute the current available budget.

16. The system of claim 15 wherein the service level agreement is associated with at least one of: a service provider, an application and a network node.

17. The system of claim 10 wherein if the request is denied processing, said request is assigned to a traffic shaping queue to be processed at a later point in time.

18. The system of claim 10 wherein the budget service tracks historical data such that the budget is compensated for lost request traffic that was not processed during a network failure.

19. A non-transitory computer-readable medium storing one or more sequences of instructions for throttling request traffic, which instructions, when executed by one or more processors, cause the one or more processors to carry out the steps of:

receiving, at a gateway, one or more incoming requests from an application associated with a service provider, the request to be processed by a network node of said gateway;

determining, by said gateway, a budget for the application, wherein the budget for the application reflects current request rate being sent by the application based on traffic history;

determining, by said gateway, a budget for the service provider, wherein the budget for the service provider reflects current request rate being sent by the service provider based on traffic history;

determining a budget for a network node in the gateway, wherein the budget for the network node reflects current request rate being processed by the network node based on traffic history; and throttling the incoming requests at the gateway according to each of: the budget for the application, the budget for the service provider and the budget for the network node;

wherein throttling the incoming requests according to the budget for the application and the budget for the service provider further includes:

determining whether the budget for the application and the budget for the service provider are available; and if available, allowing the request to be processed and decreasing the budget for the application and the budget for the service provider accordingly, otherwise denying the request from being processed;

wherein throttling the incoming requests according to the budget for the network node further includes:

determining a priority for each of said incoming requests, the priority being based on a service level agreement;

processing said incoming requests if the budget for the network node in the gateway is over a guarantee threshold;

rejecting the incoming request of low priority if the budget for the network node in the gateway is under said guarantee threshold; and processing the incoming requests of high priority unless the budget for the network node in the gateway is below an available limit.

* * * * *

UNITED STATES PATENT AND TRADEMARK OFFICE
CERTIFICATE OF CORRECTION

| | | |
|---|---|---|
| PATENT NO. | : 7,895,353 B2 | |
| APPLICATION NO. | : 12/188397 | |
| DATED | : February 22, 2011 | |
| INVENTOR(S) | : Jansson | |

It is certified that error appears in the above-identified patent and that said Letters Patent is hereby corrected as shown below:

In column 4, line 49, delete "then" and insert -- than --, therefor.

In column 9, line 30, delete "provider" and insert -- provide --, therefor.

In column 12, line 35, after "as" insert -- IM. --.

In column 13, line 38, delete "requester" and insert -- requestor --, therefor.

In column 16, line 21, in Claim 12, delete "10" and insert -- 11 --, therefor.

Signed and Sealed this
Fourth Day of October, 2011

David J. Kappos
*Director of the United States Patent and Trademark Office*